US006490448B1

(12) United States Patent
Hogberg et al.

(10) Patent No.: US 6,490,448 B1
(45) Date of Patent: Dec. 3, 2002

(54) SNAP TO GRID VARIABLE BEAM SIZE DIGITAL BEAMFORMING SYSTEM

(75) Inventors: Shawn Wesley Hogberg, Chandler; Jonathan Henry Gross, Gilbert, both of AZ (US); Gerald Joseph Davieau, Eldersburg, MD (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/459,001

(22) Filed: Dec. 10, 1999

(51) Int. Cl.[7] .................................................. H04Q 7/20
(52) U.S. Cl. ........................ 455/427; 455/429; 455/430; 455/12.1; 455/13.3; 455/13.4; 342/354
(58) Field of Search .................................. 455/427, 428, 455/429–431, 12.1, 13.1, 13.2–13.4; 342/354, 352, 353, 373

(56) References Cited

U.S. PATENT DOCUMENTS

| 5,439,190 A | | 8/1995 | Horstein et al. | |
|---|---|---|---|---|
| 5,548,294 A | | 8/1996 | Sturza | |
| 5,736,959 A | * | 4/1998 | Patterson et al. | 342/354 |
| 5,754,139 A | | 5/1998 | Turcotte et al. | |
| 5,918,176 A | * | 6/1999 | Arrington, Jr. et al. | 455/430 |
| 6,272,317 B1 | * | 8/2001 | Houston et al. | 455/13.1 |

* cited by examiner

Primary Examiner—Dwayne Bost
Assistant Examiner—Gregory V. Old
(74) Attorney, Agent, or Firm—Ingrassia Fisher & Lorenz

(57) ABSTRACT

A satellite communications system (10) provides for snap to grid variable beam size digital beamforming. The communications system (10) has an antenna configuration (20) for maintaining communications links with satellite networking equipment, and a signal processing system (30) for processing signals resulting from the communications links. The beamforming subsystem (40) forms beams based on the processed signals wherein the beams match predetermined grid information. The beamforming subsystem (40) includes a grid database (50) containing predetermined grid information. A beamforming processor (60) converts the predetermined grid information contained in the grid database (50) antenna coefficients. An antenna management system forms beams based on the antenna coefficients.

20 Claims, 5 Drawing Sheets

○ IN-BUILDING  ○ IN-VEHICLE  ◯ MOBILE OUTDOOR

SNAP TO GRID VARIABLE BEAM SIZE DIGITAL BEAMFORMING SYSTEM

BACKGROUND OF THE INVENTION

1. Technical Field

The present invention relates generally to satellite communication systems. More particularly, the present invention is directed to a system and technique for digital beamforming based on predetermined grid information.

2. Discussion

A primary interest of telecommunications technology is enhancing the features offered by communication systems and expanding the coverage area of these systems. The principal goal behind developing next generation communication systems is either to improve the transmission fidelity, to increase the data rate, or to increase the distance between relay stations. In an effort to accomplish these objectives, earth-based (or terrestrial) communication systems have evolved over the years to incorporate high-speed electro-optic equipment and optical fibers. The result has been a substantial increase in the fidelity and speed of transmissions. Optical communication has therefore allowed quality and grade of service to reach new heights. Optical communication systems have not provided, however, a solution to the increasing mobility of today's society and the need for global communication.

First generation satellite telecommunication systems are now capable of providing communications services around the world using RF signals. These sophisticated communications satellites transmit many telephone, data and television signals simultaneously over long distances. Satellite communication systems have therefore proven to be well suited for the increasing demand for wireless communications and global transmissions. Substantial competition still exists, however, between satellite and terrestrial communication systems in the arena of quality of service. It is therefore desirable to improve the transmission fidelity and data rate of satellite-based communication systems and thereby improve the quality and grade of service.

Conventional satellite communications networks employ a plurality of interconnected space vehicles, or satellites, in an effort to provide satellite communication channels to subscriber equipment via transmitted beams. Attenuation in the beams is common and is generally due to environmental effects such as trees and rain. In a given service area, it is therefore necessary to specify acceptable levels of attenuation in the beam transmitted from the satellite and received by the subscriber equipment (e.g., pagers, mobile phones, etc.). Attenuations are specified in terms of (ink margins and can be defined for different types of communication links such as in-building, in-vehicle, and mobile outdoor links.

In the past, satellites used fixed antenna beams to provide communication channel coverage over the entire satellite footprint. This technique of providing communications links is potentially inefficient due to the need to provide coverage over the entire satellite footprint while providing high gain antenna beams to improve link quality and subscriber equipment characteristics. For example, the additional necessary hardware required to form enough fixed high gain antenna beams to cover the satellite footprint will substantially increase the satellite size, weight, power, and processing requirements. The communications electronics payload is also affected because of the added complexity of the switching, routing, and processing of the communication channels associated with these beams.

Recent trends have been toward providing an increasing number of narrow antenna beams to improve spectral efficiency, link quality, and improve subscriber equipment characteristics (e.g. size, weight, power, channel throughput, etc.). Thus, satellites are configured with an array of antenna beams that can provide hundreds of signals to predetermined areas of the satellite footprint. This technique provides a means to deal with increased antenna complexity while providing complete coverage within the satellite footprint.

Implementation of narrow beamforming, however, has been inflexible and has failed to make sufficient use of information regarding the service area. For example, link margins and service areas change drastically from region to region while conventional beam configurations remain fixed as the satellite orbits the earth. This is an issue of considerable concern because processing power is wasted in areas of sparse population such as uninhabited rain forests. In order for narrow beamforming to be a viable alternative, the satellite must be able to adjust the size, location, and content of each beam in the footprint as the communication requirements change. Providing such a real-time response to consumer demand is crucial in closing the gap between satellite and terrestrial quality and grade of service.

It is therefore desirable to provide maximum coverage at the necessary link margins. It is further desirable to provide variable link margin services in areas capable of supporting these margins and or willing to pay premium prices for higher link margin services. Another concern with the use of multiple beams is due to the effect of the number of beams on the size of the antenna array. Conventional approaches have effectively "blanketed" the satellite footprint with beams of fixed strength and thereby required the use of large, bulky antenna arrays. The use of digital beamforming technology would allow selective formation of beam sizes and significantly reduce power and processing consumption by reducing the number of required beams.

BRIEF DESCRIPTION OF THE DRAWINGS

The various advantages of the present invention will become apparent to one skilled in the art by reading the following specification and appended claims, and by referencing the following drawings in which:

DETAILED DESCRIPTION OF THE PREFERRED EMBODIMENT

Figure 1:
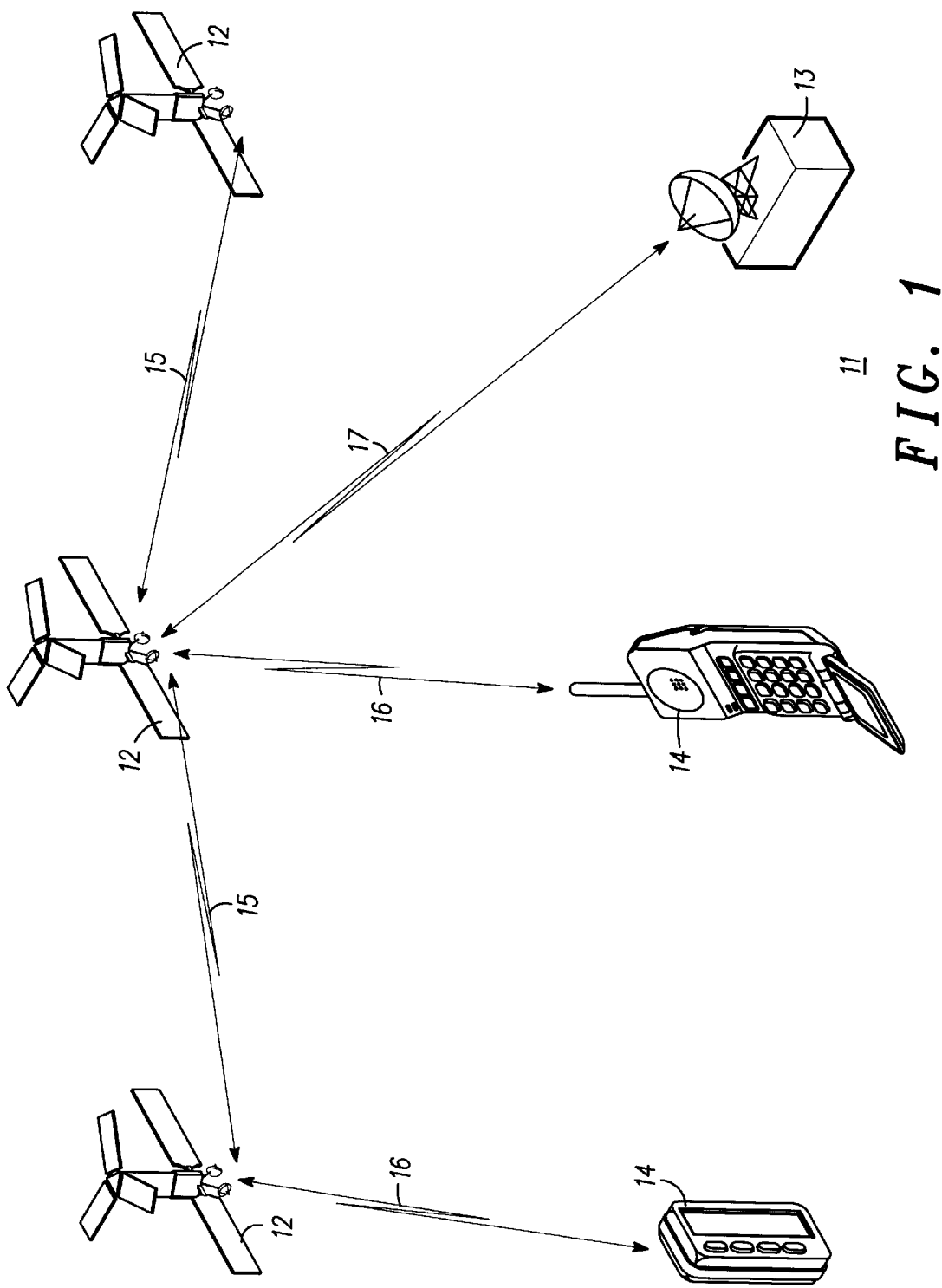
FIG. 1 is a diagram showing the components of the satellite communications network of the present invention.

Turning now to FIG. 1, a satellite communications network 11 is shown in accordance with a preferred embodiment of the present invention. The communications network 11 includes a number of satellites 12, any number of subscriber devices 14, and any number of ground stations 13. Although the present invention is applicable to space-based communications networks having at least one satellite 12 in low-earth or medium-earth orbit, each satellite 12 is preferably part of a number of satellites in low-earth orbit around earth. In alternative embodiments, however, satellite 12 can be a medium-earth orbit satellite or geosynchronous satellite. The constellation of satellites can be in the same satellite network, or can be in different satellite networks.

A "satellite" as used herein means a man-made object or vehicle, which orbits the earth at non-geostationary altitudes or geostationary altitudes. Non-geostationary altitudes are considered to be low-earth or medium-earth altitudes. A "constellation" means a number of satellites arranged in orbits for providing specified coverage of a portion, portions or all of the earth. Coverage includes but is not limited to radio communication and remote sensing. A constellation typically includes multiple rings or planes of satellites and can have an equal number of satellites in each plane, although this is not essential.

Thus, satellite 12 can be one of many satellites in at least one constellation of satellites orbiting the earth. The present invention is also applicable to space-based communication networks having satellites 12, which orbit the earth at any angle of inclination including polar, equatorial, inclined or other orbital patterns. The present invention is therefore applicable to networks wherein full coverage of the earth is not achieved (i.e., where there are "holes" in the communication coverage provided by the constellation) and to networks wherein plural coverage of portions of the earth occurs (i.e., more than one satellite is in view of a particular point on the earth's surface).

Each satellite 12 communicates with other adjacent satellites 12 through crosslinks 15 in a preferred embodiment of the present invention. These crosslinks 15 form the backbone of space-based satellite communication network 11. Thus, a call or communication from one subscriber device 14 located at any point on or near the surface of the earth can be routed through a satellite or constellation of satellites to virtually any other point on the surface of the earth. A communication link can be routed down to a subscriber device 14 (which is receiving the call) on or near the surface of the earth from another satellite. In alternative embodiments, if there are no crosslinks 15, one satellite 12 can communicate with another satellite 12 via routing the call through ground station 13.

Subscriber devices 14 can be located anywhere on the surface of the earth or in the atmosphere above the earth. Communication network 11 can accommodate any number of subscriber devices 14. Subscriber devices 14 preferably include communication devices capable of transmitting and receiving data. The data can be of any type, including alpha numeric or numeric data. For example, a subscriber device 14 can be a satellite telephone or satellite pager. Moreover, a subscriber device 14 does not have to be mobile or moving, but can be fixed in one location for an extended period of time.

Ground station 13 communicates with and controls satellites 12. For example, in one type of system ground station 13 can be a gateway or satellite control facility. In a preferred embodiment, there can be multiple ground stations 13 located at different regions on the earth. For example, there can be one ground station 13 located in Honolulu, another located in Los Angeles and another in Washington, D.C. Another example is to have separate ground stations 13 located in each country on the earth. Ground stations 13 can provide satellite control commands to satellites 12 such that satellites 12 maintain their proper orbital position and perform other essential housekeeping tasks. Ground stations 13 can be additionally responsible for receiving calling packet data, packaging data or other types of information from satellite 12.

Figure 2:
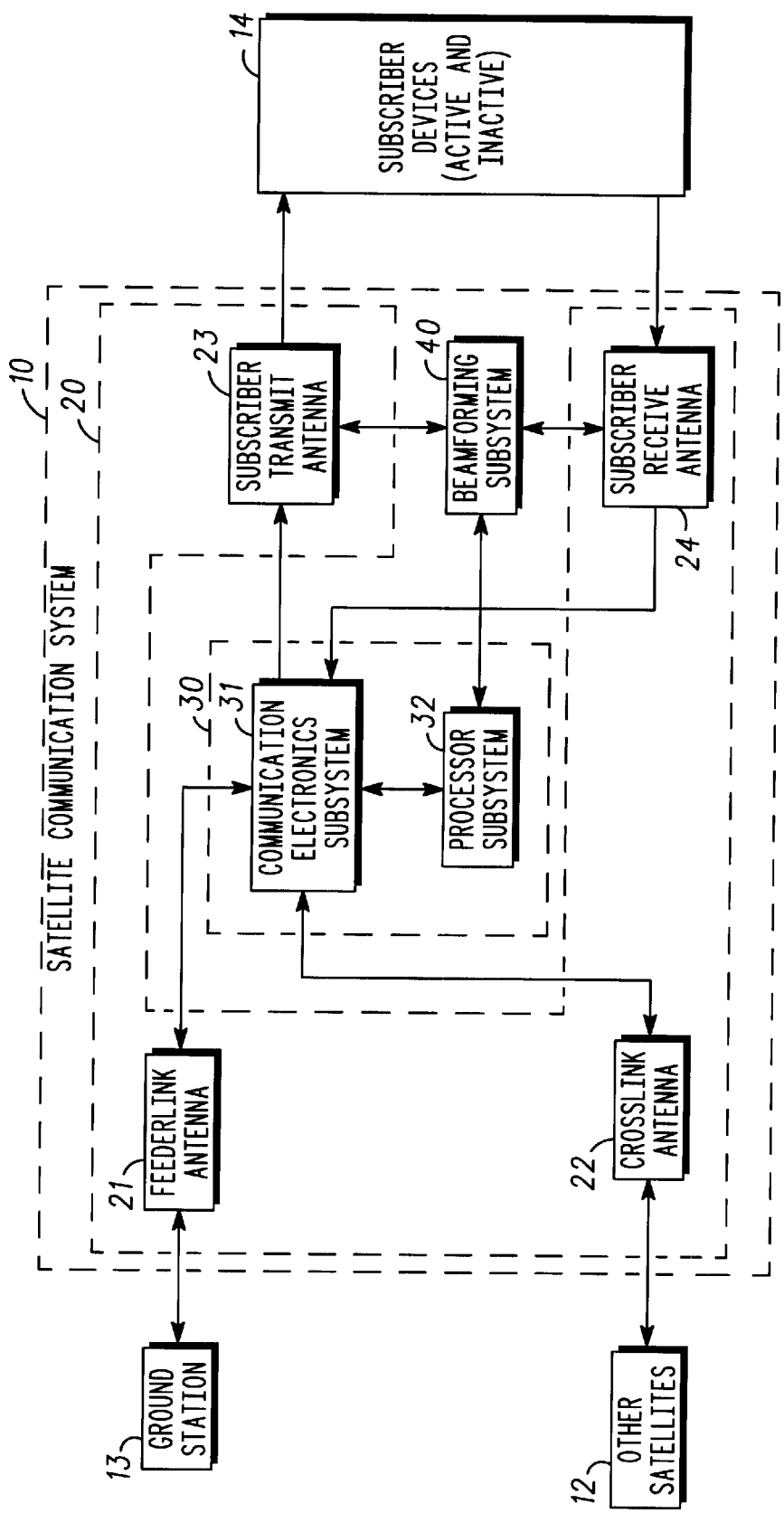
FIG. 2 is a diagram of the satellite communications system of the present invention.

It will be appreciated that ground stations 13 provide certain basic services within satellite communication network 11. For example, they provide control of access to the network 11 for subscribers for whom the base station 13 is "home". Therefore, information will be stored at the ground station 13 about certain subscribers, including information to authenticate the subscriber's identity and what services are available to the subscriber. The ground stations 13 also provide network subscribers with assess to public switched telephone network (PSTN) and it provides PSTN customers with access to subscribers throughout the communications network 11. As shown in FIG. 2, satellite 12 have a satellite communications system 10 to be described below, which provides communication channels to subscriber devices 14.

Figure 6:
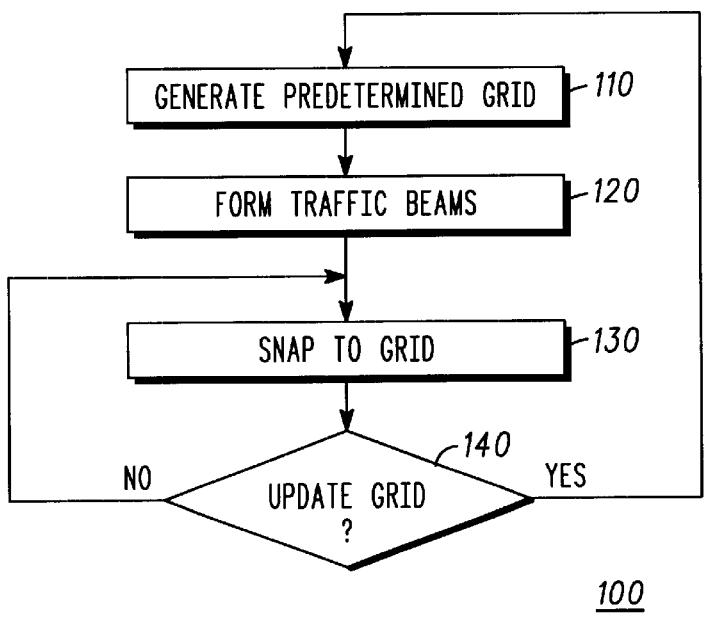
FIG. 6 is a flowchart of a computerized method to providing satellite communication channels within a satellite footprint according to the present invention.

In accordance with the present invention, beams are formed to match predetermined grid information. FIG. 6 shows a computerized method 100 for providing satellite communication channels within a satellite footprint for programming purposes. It will be appreciated that method 100 can be readily implemented with processing hardware and software using techniques well known in the art. The method 100 includes the step 110 of generating a predetermined grid for the satellite footprint. As already discussed, the predetermined grid contains link margin information for the communication channels. At step 120, beams are formed such that the beams match the link margin information. It will be appreciated that the beams contain the desired communication channel. Step 120 can be performed by extracting variable beam sizes and communication channel information from the link margin information contained in the predetermined grid. The method 100 further provides for snapping the beams to the predetermined grid at step 130. Step 130 is preferably performed by extracting beam locations from the predetermined grid. Finally, a mechanism for determining when a grid update is required is shown at step 140. It will be appreciated that the channel information can include information about in-building communication channels, in-vehicle communications channels, and mobile outdoor channels. While the discussion of the preferred embodiment refers to these communication channels, it will be appreciated that other communication channels can be readily implemented without parting from the scope of the invention. It will further be appreciated that power and processing consumption can be managed based on the predetermined grids of the present invention using satellite management techniques well known in the art.

Figure 7:
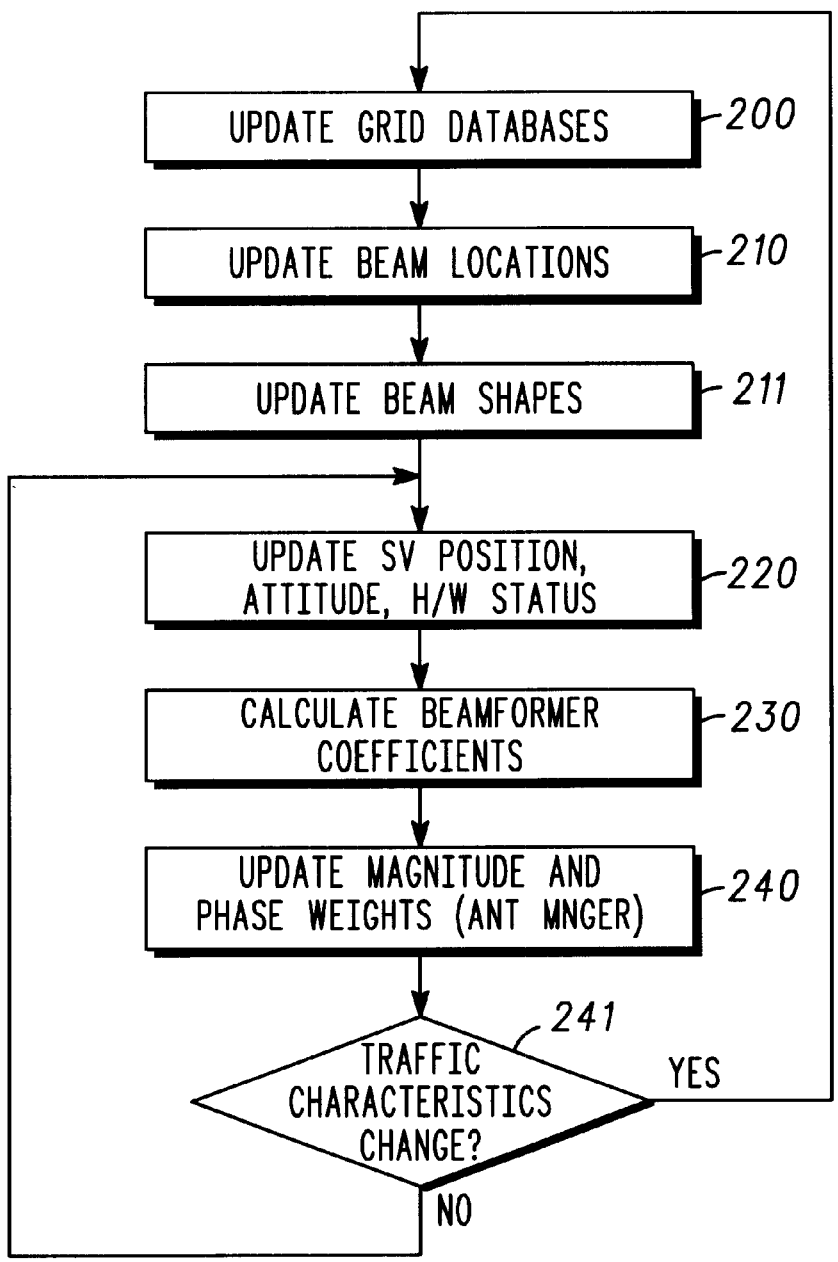
FIG. 7 is a more detailed flowchart of the process shown in FIG. 6.

Turning now to FIG. 7, the preferred beamforming flow diagram is shown in greater detail. Specifically, at step 200 the grid databases are updated. The beam locations are updated at step 210, and the beam shapes are updated at step 211. The information necessary to update locations and shapes is contained in the aforementioned database. It will be appreciated that at step 220 the satellite vehicle position, attitude, and hardware status are updated. It can further be appreciated that beamformer coefficients are calculated at step 230. At step 240, the magnitude and phase weights are updated. Step 241 provides for the determination of whether traffic characteristics have changed. When such changes occur, the present invention provides for modification of the beam structure accordingly.

Figure 3:
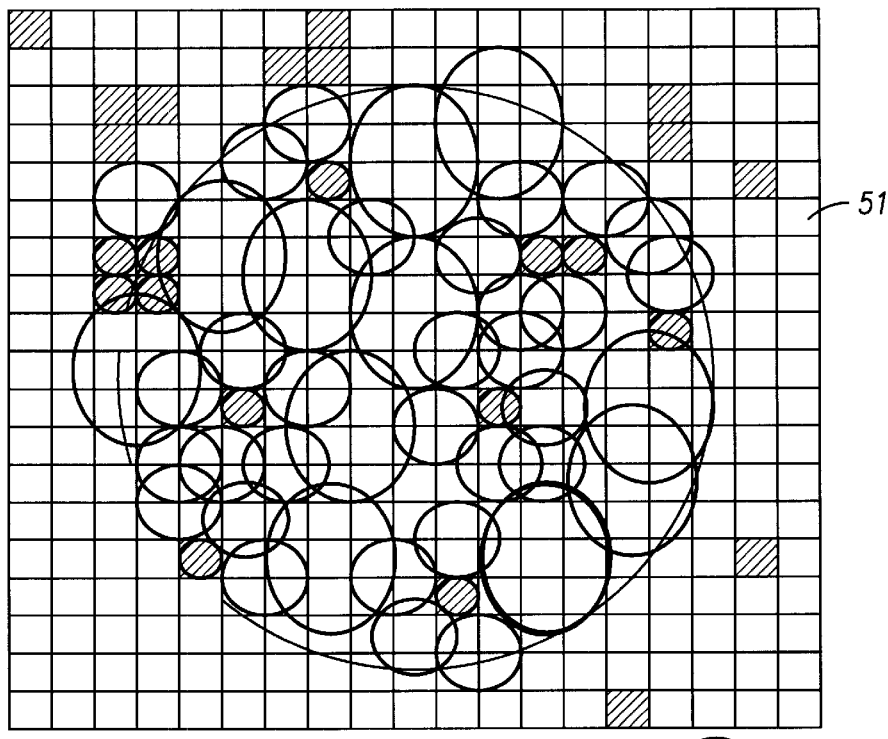
FIG. 3 is a diagram of a predetermined grid at an instant in time according to the present invention.

As already discussed, it is preferred that the predetermined grid information has a temporal and geographical dependence. Thus, as shown in FIG. 3, for each instant in time, a predetermined grid 51 defines the necessary link margins and locations for the satellite footprint. This allows the satellite communications system 10 to define the time varying, geographically based, quality of service requirements necessary to meet user needs and conserve satellite resources. As a result, size, weight, and power can be minimized.

Returning now FIG. 2, the preferred satellite communications system 10 of the present invention is shown. It can be appreciated that communications system 10 is designed and programmed to perform the above steps and functions as well as others to be discussed below. Specifically, communications system 10 has an antenna configuration 20, a signal processing system 30, and a beamforming subsystem 40. The antenna configuration 20 maintains communications links with satellite networking equipment, while the signal processing system 30 processes the signals resulting from the communications links. The beamforming subsystem 40 forms beams based on the processed signals, wherein the beams match predetermined grid information.

Specifically, it can be seen that the antenna configuration 20 preferably includes a feederlink antenna 21 for maintaining feederlinks 17 with ground stations 13 (FIG. 1). A crosslink antenna 22 is also included and maintains crosslinks 15 with satellites 12. Generally, a subscriber antenna configuration maintains subscriber links 16 with subscriber devices 14. Specifically, the subscriber antenna configuration includes a subscriber transmit antenna 23 for transmitting subscriber link beams to subscriber devices 14, and a subscriber receive antenna 24 for receiving subscriber link signals from subscriber devices 14.

Preferably, the signal processing system 30 has a communication electronics subsystem 31 for performing communication functions in the communications system 10. Specifically, the communication electronics subsystem 31 performs frequency conversion, switching, and modem functions. A processor subsystem 32 performs management and control functions in the communications system 10. As will be discussed in greater detail later, the processor subsystem 32 updates the grid database with predetermined grid information for use in beamforming. The processor subsystem 32 preferably performs channel management, satellite resource management, and satellite control functions.

Figure 4:
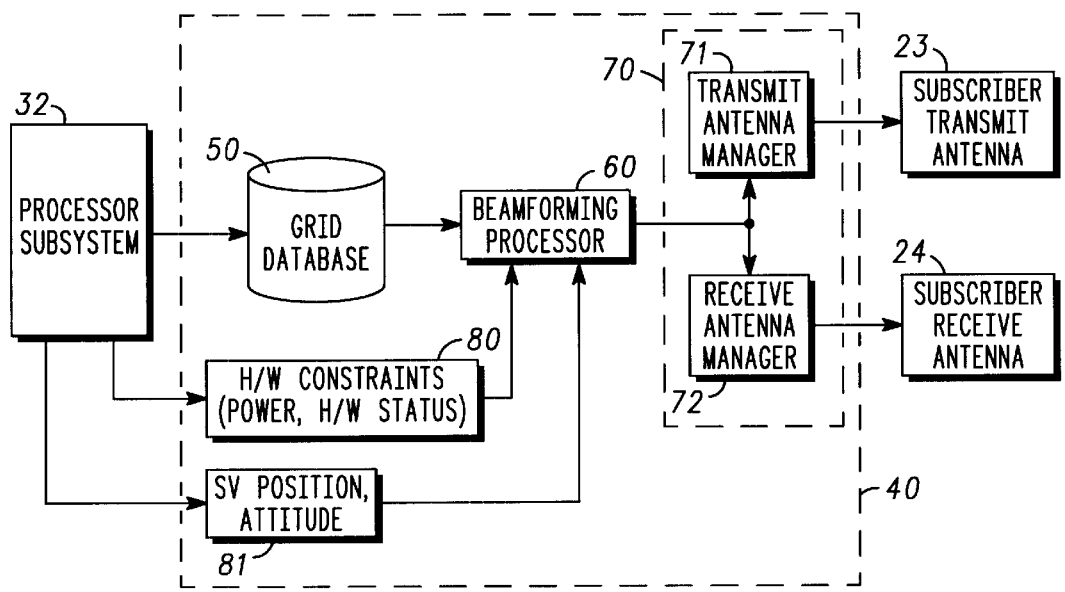
FIG. 4 is a block diagram of the beamforming subsystem of the present invention.

Turning now to FIG. 4, the beamforming subsystem 40 will be described in greater detail. It will be appreciated that the beamforming subsystem 40 includes a grid database 50, a beamforming processor 60, and an antenna management system 70. The grid database 50 contains predetermined grid information. The beamforming processor 60 converts the predetermined grid information contained in the grid database 50 into antenna coefficients. The antenna management system 70 forms beams based on the antenna coefficients. Preferably, the predetermined grid information contains information regarding desired beam locations, beam coverage area, link margins, and associated antenna gains. It is important to note that beamforming subsystem 40 can be implemented entirely on the ground or partially on the ground via ground stations 13 (FIG. 1).

Figure 5:
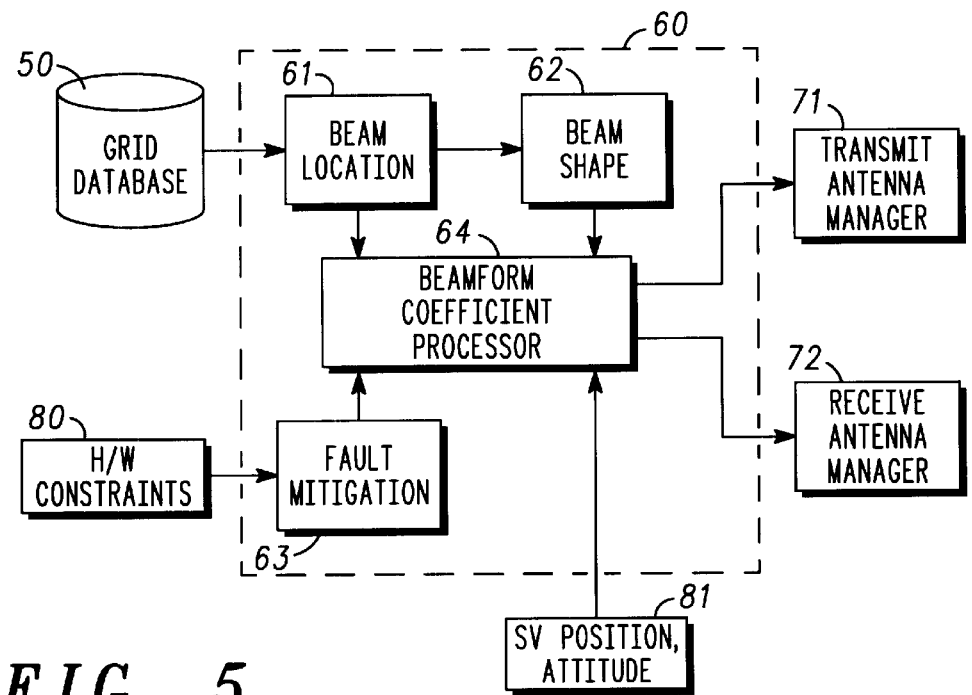
FIG. 5 is a block diagram of a beamforming processor according to the present invention.

With reference to FIG. 5, the beamforming processor 60 of the beamforming subsystem 40 will be described in greater detail. It will be appreciated that the beamforming processor 60 has a beam location module 61 for updating beam locations based on the predetermined grid information contained in the grid database 50. The beamforming processor 60 further includes a beam shape module 62 for updating beam shapes based on the predetermined grid information and the updated beam locations. It will be appreciated that beam locations and shapes relate to the pointing angles and contours of generated beams. A fault mitigation module 63 generates power and processing consumption management information based on satellite hardware constraints.

It can be seen that the beamforming processor 60 further includes a beam coefficient processor 64 for calculating antenna coefficients based on the updated beam locations, the updated beam shapes, power and processing consumption management information, and antenna physical configuration data. It will further be appreciated that the beam coefficient processor 64 uses satellite vehicle position and attitude in making calculations. Antenna coefficients define the phase and amplitude coefficients of each element in an antenna array. Preferably, the beam coefficient processor 64 calculates transmit antenna coefficients and receive antenna coefficients.

Returning to FIG. 4, it will be appreciated that the antenna management system 70 includes a transmit antenna manager 71, and a receive antenna manager 72. The transmit antenna manager 71 forms beams for the subscriber transmit antenna 23, whereas the receive antenna manager 72 forms beams for the subscriber receive antenna 24. The control functions performed by the antenna managers include managing antenna hardware such as antenna array element weightings, phase shifters, etc. It will further be appreciated that the beamforming subsystem 40 further includes a hardware constraint module 80 for providing the beamforming processor 60 with satellite hardware constraint data. The hardware constraint data allows the satellite to avoid power consumption problems and ensures that there is enough hardware (e.g. switching, tuners, antenna elements) to support the number of beams formed in any single time slot. A satellite position and attitude module 81 is also included for providing the beamforming processor 60 with satellite position and attitude data. The satellite position and attitude are necessary to correctly point the antenna beams over the subscriber locations.

The foregoing discussion discloses and describes exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A method for providing satellite communication channels within a satellite footprint, the method comprising the steps of generating a predetermined grid for the satellite footprint, the predetermined grid containing link margin information for the communication channels;

extracting variable beam sizes from the link margin information;

forming beams such that the beams match the variable beam sizes, the beams containing the communication channels; and aligning the beams with the predetermined grid.

2. The method of claim 1 further comprising the step of extracting beam locations from the predetermined grid.

3. The method of claim 2 wherein the predetermined grid has a temporal dependence.

4. The method of claim 2 wherein the predetermined grid has a geographical dependence.

5. The method of claim 1 further comprising the step of managing power and processing consumption based on the predetermined grid.

6. The method of claim 1 further comprising the step of extracting communication channel information from the link margin information.

7. The method of claim 6 wherein the channel information include information about in-building communication channels.

8. The method of claim 6 wherein the channel information include information about in-vehicle communication channels.

9. The method of claim 6 wherein the channel information include information about mobile outdoor channels.

10. A satellite communications system comprising:
   an antenna configuration for maintaining communications links with satellite networking equipment;
   a signal processing system for processing signals resulting from the communications links; and
   a beamforming subsystem for forming beams based on the signals processed by the signal processing system, the beams matching predetermined grid information, said beam forming subsystem comprising:
      a grid database containing the predetermined grid information;
      a beamforming processor for converting the predetermined grid information contained in the grid database into antenna coefficients, said beamforming processor comprising:
         a beam location module for updating beam locations based on the predetermined grid information contained in the grid database;
         a beam shape module for updating beam shapes based on the predetermined grid information and the updated beam locations;
         a fault mitigation module for generating power and processing consumption management information based on satellite hardware constraints; and
         a beamform coefficient processor for calculating antenna coefficients based on the beam locations updated by the beam location module, the beam shapes updated by the beam shape module, power and processing consumption management information, and physical configuration data; and
      an antenna management system for forming beams based on the antenna coefficients.

11. The communications system of claim 10 wherein the antenna configuration includes:
   a feederlink antenna for maintaining feederlinks with ground stations;
   a crosslink antenna for maintaining crosslinks with satellite vehicles; and
   a subscriber antenna configuration for maintaining subscriber links with subscriber devices.

12. The communications system of claim 11 wherein the subscriber antenna configuration includes:
   a subscriber transmit antenna for transmitting subscriber link beams to subscriber devices; and
   a subscriber receive antenna for receiving subscriber link signals from subscriber devices.

13. The communications system of claim 10 wherein the signal processing system includes:
   a communication electronics subsystem for performing communication functions in the communications system; and
   a processor subsystem for performing management and control functions in the communications system, the processor subsystem updating a grid database with predetermined grid information.

14. The communications system of claim 13 wherein the communication electronics subsystem performs frequency conversion, switching, and modem functions.

15. The communications system of claim 13 wherein the processor subsystem performs channel management, satellite resource management and satellite control functions.

16. A beamforming subsystem for a satellite communications system, the subsystem comprising:
   a grid database containing predetermined grid information;
   a beamforming processor for converting the predetermined grid information the grid database into antenna coefficients, said beamforming processor comprising;
      a beam location module for updating beam locations based on the predetermined grid information contained in the grid database;
      a beam shape module for updating beam shapes based on the predetermined grid information and the updated beam locations;
      a fault mitigation module for generating power and processing consumption management information based on satellite hardware constraints; and
      a beamform coefficient processor for calculating antenna coefficients based on the beam locations updated by the beam location module, the beam shapes updated by the beam shape module, power and processing consumption management information, and physical configuration data; and
   an antenna management system for forming beams based on the antenna coefficients.

17. The beamforming subsystem of claim 16 wherein the predetermined grid information contains information regarding desired beam locations, beam coverage area, link margins, and associated antenna gains.

18. The beamforming subsystem of claim 16 wherein the beamform coefficient processor calculates transmit antenna coefficients and receive antenna coefficients.

19. The beamforming subsystem of claim 16 wherein the antenna management system includes:
   a transmit antenna manager for forming beams for a subscriber transmit antenna; and
   a receive antenna manager for forming beams for a subscriber receive antenna.

20. The beamforming subsystem of claim 16 further including:
   a hardware constraint module for providing the beamforming processor with satellite hardware constraint data; and
   a satellite position and attitude module for providing the beamforming processor with satellite position and attitude data.

* * * * *

UNITED STATES PATENT AND TRADEMARK OFFICE
CERTIFICATE OF CORRECTION

PATENT NO.     : 6,490,448 B1
DATED          : December 3, 2002
INVENTOR(S)    : Shawn Wesley Hogberg It is certified that error appears in the above-identified patent and that said Letters Patent is hereby corrected as shown below:

<u>Column 7,</u>
Lines 8, 11 and 14, delete "include" and insert -- includes --.

Signed and Sealed this

Twenty-sixth Day of July, 2005

JON W. DUDAS
*Director of the United States Patent and Trademark Office*